United States Patent
Park et al.

(10) Patent No.: US 9,916,057 B2
(45) Date of Patent: Mar. 13, 2018

(54) TOUCH PANEL, DISPLAY DEVICE HAVING THE SAME, AND METHOD OF MANUFACTURING THE TOUCH PANEL

(71) Applicant: Samsung Display Co., Ltd., Yongin-si, Gyeonggi-do (KR)

(72) Inventors: Sung Kyun Park, Yongin-si (KR); Jae Wook Kang, Yongin-si (KR); Kyung Seop Kim, Yongin-si (KR); Jung Ha Son, Yongin-si (KR); Sang Kyu Choi, Yongin-si (KR); Yong Woo Park, Yongin-si (KR); Sang Youn Han, Yongin-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 16 days.

(21) Appl. No.: 15/140,227

(22) Filed: Apr. 27, 2016

(65) Prior Publication Data

US 2017/0052619 A1 Feb. 23, 2017

(30) Foreign Application Priority Data

Aug. 20, 2015 (KR) .......................... 10-2015-0117460

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01); *G06F 2203/04103* (2013.01); *G06F 2203/04111* (2013.01)

(58) Field of Classification Search
CPC ..................... G06F 3/047; G06F 3/044; G06F 2203/04103; G06F 2203/04111; G06F 1/1643; G06F 3/0416; G06F 3/0412
See application file for complete search history.

(56) References Cited

U.S. PATENT DOCUMENTS

2010/0212974 A1 8/2010 Kim
2011/0148781 A1* 6/2011 Chen ..................... G06F 3/0412
345/173

(Continued)

FOREIGN PATENT DOCUMENTS

JP 2012-94115 A 5/2012
KR 10-2010-0095126 A 8/2010

(Continued)

*Primary Examiner* — Richard Hong
(74) *Attorney, Agent, or Firm* — Knobbe Martens Olson & Bear LLP

(57) ABSTRACT

A touch panel, a display device having the same, and a method of manufacturing the touch panel are disclosed. In one aspect, the touch panel includes a base substrate and a first sensing portion extending in a first direction and formed over the base substrate. The first sensing portion including a plurality of first fine lines defining a plurality of spaces therebetween. The touch panel also includes a second sensing portion extending in a second direction crossing the first direction and formed over the base substrate and a first insulating layer covering the first fine lines. The first insulating layer defines a plurality of openings therein corresponding to the spaces between the first fine lines. The second sensing portion crosses the first sensing portion with the first insulating layer interposed therebetween.

16 Claims, 7 Drawing Sheets

(56) References Cited

U.S. PATENT DOCUMENTS

| | | | |
|---|---|---|---|
| 2011/0262631 A1 | 10/2011 | Lee et al. | |
| 2012/0234663 A1 | 9/2012 | Hwang et al. | |
| 2012/0273336 A1* | 11/2012 | Kuriki | G06F 3/044 200/600 |
| 2013/0087441 A1* | 4/2013 | Kim | H03K 17/9618 200/5 A |
| 2014/0152910 A1* | 6/2014 | Kang | G06F 1/1643 349/12 |
| 2015/0060125 A1* | 3/2015 | Stevenson | G06F 3/044 174/261 |
| 2016/0274398 A1* | 9/2016 | Hirakata | G06F 3/0416 |

FOREIGN PATENT DOCUMENTS

| | | |
|---|---|---|
| KR | 10-2011-0118411 A | 10/2011 |
| KR | 10-2012-0092004 A | 8/2012 |
| WO | WO 2012/057165 A1 | 5/2012 |

* cited by examiner

TOUCH PANEL, DISPLAY DEVICE HAVING THE SAME, AND METHOD OF MANUFACTURING THE TOUCH PANEL

CROSS-REFERENCE TO RELATED APPLICATION

This application claims priority to and the benefit of Korean Patent Application No. 10-2015-0117460, filed on Aug. 20, 2015, in the Korean Intellectual Property Office, the entire contents of which are incorporated herein by reference in their entirety.

BACKGROUND

Field

The present disclosure generally relates to a touch panel, a display device having the same, and a method of manufacturing the touch panel.

Description of the Related Technology

A touch panel is an input device formed over a display device. A user can make a selection of an icon or area displayed on the display device by touching the desired icon or area with a handheld object (e.g., a stylus) or one or more fingers. The display device recognizes the position of the touch selection via the touch panel and receives content using the position of the selection as an input signal. The display device can change the displayed image in response to the input signal.

The popularity of touch panels has been on the rise since their introduction due to their advantageous feature of not requiring a separate input capability such as a keyboard, and/or a mouse. This is of particular importance with the widespread adoption of computing devices.

Accordingly, touch panels have become a common type of input for display devices. Touch panels are formed on a display panel for displaying images, and can detect information regarding a touch input position after receiving the touch input from a user.

SUMMARY OF CERTAIN INVENTIVE ASPECTS

One inventive aspect is a high quality touch panel and a display device with the same.

Another aspect is a manufacturing method of the touch panel whose manufacturing process is relatively simple.

Another aspect is a touch panel including a base substrate; a first sensing part that extends in a first direction on the base substrate and that includes first fine lines; a second sensing part that extends in a second direction crossing the first direction; and a first insulating layer that covers the first fine lines and that is spaced apart from each other between the adjacent first fine lines. The second sensing part crosses the first sensing part with interposing the first insulating layer therebetween.

In an embodiment of the present disclosure, the first sensing part can include: first sensing electrodes arranged in the first direction; and a first bridge that connects two adjacent second electrodes with each other.

In an embodiment of the present disclosure, the second sensing part can include: a plurality of second sensing electrodes arranged in the second direction; and a second bridge that connects two adjacent first electrodes with each other. The first bridge and the second bridge can be overlapped with each other when viewed from a plan view, with having the first insulating layer therebetween.

In an embodiment of the present disclosure, the first sensing electrodes and the second sensing electrodes can be formed on the same layer.

In an embodiment of the present disclosure, the first insulating layer can include: an upper portion that covers a top surface of each first fine line; and a side portion that covers sides of each first fine line. In this structure, the side portion can be thicker than the upper portion.

In an embodiment of the present disclosure, the second sensing part can include second fine lines.

In an embodiment of the present disclosure, the touch panel can further include a second insulating layer that covers the second fine lines.

In an embodiment of the present disclosure, the second insulating layer can be spaced apart from each other between the adjacent first fine lines.

In an embodiment of the present disclosure, the second insulating layer can be formed of the same material as the first insulating layer.

In another embodiment of the present disclosure, the touch panel can be applicable for a display device. In this embodiment, the display device can include: a display panel for displaying an image; and a touch panel that is provided at a side of the display panel, and the touch panel can include: a base substrate; a first sensing part that extends in a first direction on the base substrate and that includes first fine lines; a second sensing part that extends in a second direction crossing the first direction; and a first insulating layer that covers the first fine lines and that is spaced apart from each other between the adjacent first fine lines.

In another embodiment of the present disclosure, the second sensing part can cross the first sensing part, having the first insulating layer therebetween.

In another embodiment of the present disclosure, the display device can further include an adhesive layer that is provided between the touch panel and the display panel and that attaches the touch panel to the display panel.

In another embodiment of the present disclosure, the display panel can include: a first substrate; a second substrate facing the first substrate; and a pixel provided between the first substrate and the second substrate.

In another embodiment of the present disclosure, the base substrate and the second substrate can be formed as an inseparable body.

Another aspect is a method of manufacturing a touch panel including forming a first sensing part with first fine lines on a base substrate; forming a first insulating layer that covers the first fine lines and that is spaced apart from each other between the adjacent fine lines; and forming a second sensing part with second fine lines on the base substrate.

In an embodiment of the present disclosure, the forming the first insulating layer can include: forming an insulating layer on the base substrate with the first sensing part thereon; and patterning the insulating layer using a photolithography.

In an embodiment of the present disclosure, the forming the first sensing part and the first insulating layer can include: sequentially forming a conductive layer and an insulating layer on the base substrate; patterning the insulating layer; etching the conductive layer using the patterned insulating layer as a mask; and performing a thermal treatment for a reflow of the patterned insulating layer.

Another aspect is a touch panel comprising a base substrate; a first sensing portion extending in a first direction and formed over the base substrate, the first sensing portion comprising a plurality of first fine lines defining a plurality of spaces therebetween; a second sensing portion extending in a second direction crossing the first direction and formed over the base substrate; and a first insulating layer covering the first fine lines, the first insulating layer defining a plurality of openings therein corresponding to the spaces between the first fine lines, wherein the second sensing portion crosses the first sensing portion with the first insulating layer interposed therebetween.

In example embodiments, the first sensing portion includes a plurality of first sensing electrodes arranged in the first direction, and a plurality of first bridges that respectively connect adjacent first sensing electrodes with each other.

In example embodiments, the second sensing portion includes a plurality of second sensing electrodes arranged in the second direction, and a plurality of second bridges that respectively connect adjacent second electrodes with each other, and the first bridges respectively overlap the second bridges when viewed in a plan view with the first insulating layer interposed therebetween.

In example embodiments, the first sensing electrodes and the second sensing electrodes are formed on the same layer.

In example embodiments, the first insulating layer includes: an upper portion that covers a top surface of each of the first fine lines; and a side portion that covers sides of each of the first fine lines, wherein the side portion is thicker than the upper portion.

In example embodiments, the second sensing portion includes second fine lines.

In example embodiments, the touch panel further comprises a second insulating layer that covers the second fine lines.

In example embodiments, the second fine lines defined a plurality of spaces therebetween and wherein the second insulating layer defines a plurality of openings therein corresponding to the spaces between the first fine lines.

In example embodiments, the second insulating layer is formed of the same material as that of the first insulating layer.

Another aspect is a display device comprising a display panel configured to display an image; and a touch panel located at a side of the display panel, wherein the touch panel includes: a base substrate; a first sensing portion extending in a first direction and formed over the base substrate, the first sensing portion comprising a plurality of first fine lines defining a plurality of spaces therebetween; a second sensing portion extending in a second direction crossing the first direction; and a first insulating layer covering the first fine lines, the first insulating layer defining a plurality of openings therein corresponding to the spaces between the adjacent first fine lines, wherein the second sensing portion crosses the first sensing portion with the first insulating layer interposed therebetween.

In example embodiments, the display device further comprises an adhesive layer interposed between the touch panel and the display panel and attaching the touch panel to the display panel.

In example embodiments, the display panel includes a first substrate; a second substrate opposing the first substrate; and a plurality of pixels interposed between the first substrate and the second substrate.

In example embodiments, the base substrate and the second substrate are integrally formed.

Another aspect is a method of manufacturing a touch panel comprising forming a first sensing portion comprising a plurality of first fine lines over a base substrate, the first fine lines defining a plurality of spaces therebetween; forming a first insulating layer so as to cover the first fine lines, the first insulating layer defining a plurality of openings therein corresponding to the spaces between the adjacent fine lines; and forming a second sensing portion comprising a plurality of second fine lines over the base substrate.

In example embodiments, the forming the first insulating layer includes: forming an insulating layer over the base substrate where the first sensing portion is formed; and patterning the insulating layer using photolithography.

In example embodiments, the forming the first sensing portion and the first insulating layer includes: forming a conductive layer and an insulating layer over the base substrate; patterning the insulating layer; etching the conductive layer using the patterned insulating layer as a mask; and performing a thermal treatment to reflow the patterned insulating layer.

DETAILED DESCRIPTION OF CERTAIN INVENTIVE EMBODIMENTS

Figure 1:
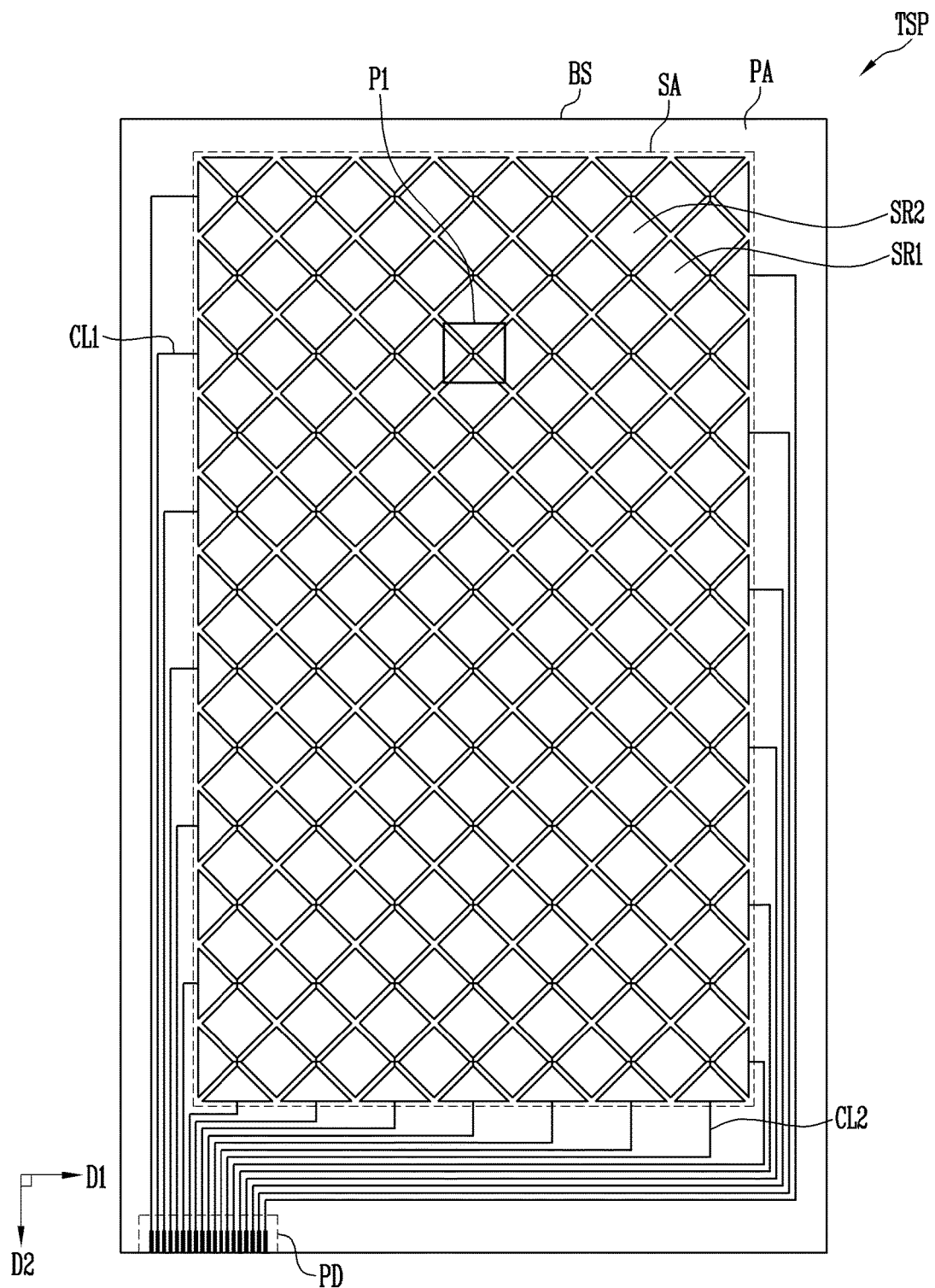
FIG. 1 is a plan view of a touch panel according to an exemplary embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete and will fully convey the scope of the example embodiments to those skilled in the art. In the drawings, the dimensions of the illustrated elements may be exaggerated for the sake of clarity. It will be understood that when an element is referred to as being "between" two elements, it can be the only element between the two elements, or one or more intervening elements may also be present. Like reference numerals refer to like elements throughout.

The accompanying drawings are provided only in order to allow exemplary embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

In the drawings, like reference numerals designate like elements throughout the specification. In addition, the thicknesses of layers, films, panels, regions, etc. may be exaggerated for the sake of clarity and ease of description.

Although the terms first, second, third, etc. may be used herein to describe various constituent elements, they are not limited thereto. These terms are used only for the purpose of discriminating one constituent element from another constituent element. For example, a first constituent element may be referred to as a second constituent element, and similarly, a second constituent element may be referred to as a first constituent element without departing from the scope of the present disclosure. Singular expressions used herein include plural expressions unless the context clearly indicates otherwise.

In the present application, it will be appreciated that terms "including" and "having" are intended to designate the existence of stated characteristics, numbers, steps, operations, constituent elements, and components described in the specification or a combination thereof, and do not exclude the possibility of the existence or addition of one or more other characteristics, numbers, steps, operations, constituent elements, and components, or a combination thereof in advance.

It will be understood that when an element such as a layer, film, region, or substrate is referred to as being "on" another element, it can be directly on the other element or intervening elements may also be present. On the contrary, it will be understood that when an element such as a layer, film, region, or substrate is referred to as being "beneath" another element, it can be directly beneath the other element or intervening elements may also be present.

The present disclosure will be described more fully hereinafter with reference to the accompanying drawings, in which exemplary embodiments of the disclosure are shown.

An exemplary embodiment of the present disclosure relates to a touch panel that recognizes a touch input event via the contact of one or more fingers, a special stylus pen, or a separate touch input capability and that displays or transmits information corresponding to the touch event. The touch panel can be included within various devices. Particularly, in a display device, the touch panel can serve as a detector for recognizing a touch input event from a user.

Hereinafter, the touch panel employed in the display device will be described.

Figure 2A:
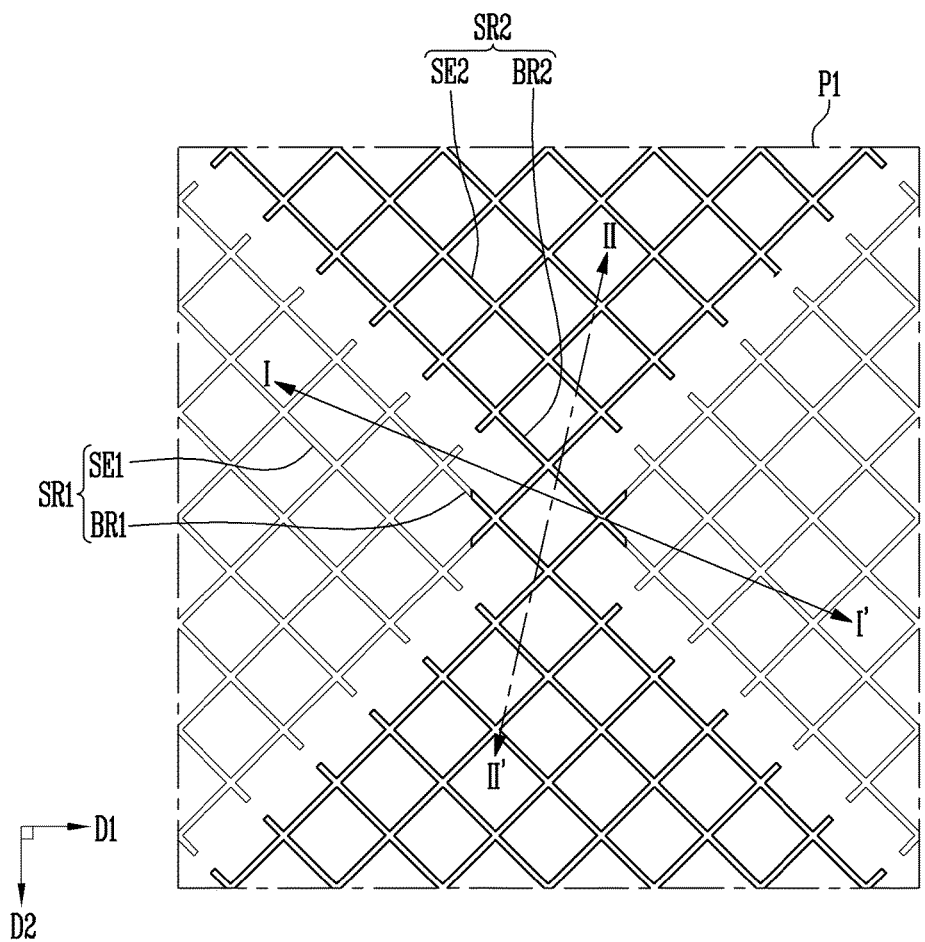
FIG. 2A is an enlarged plan view of a portion P1 of FIG. 1.
Figure 2B:
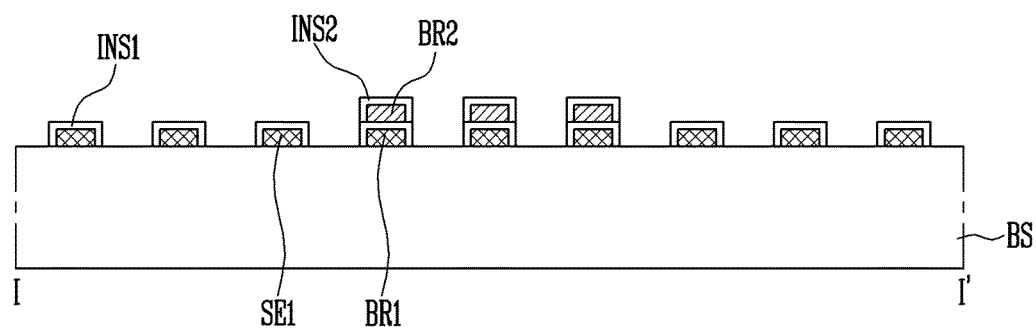
FIG. 2B is a cross-sectional view taken along the line I-I' of FIG. 2A.
Figure 2C:
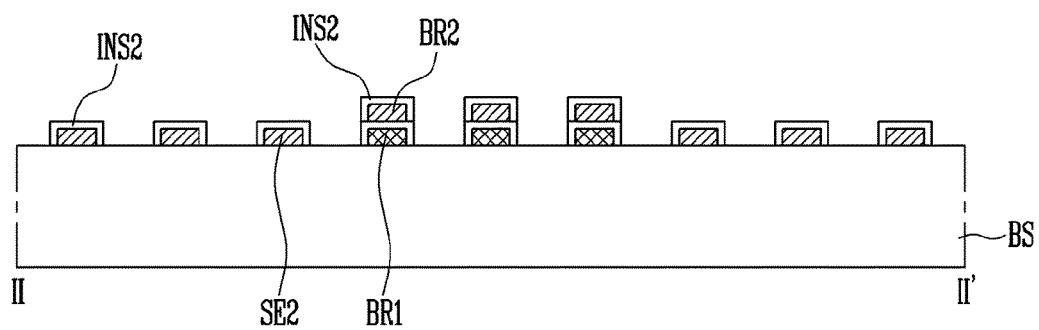
FIG. 2C is a cross-sectional view taken along the line II-II' of FIG. 2B.

FIG. 1 is a plan view of a touch panel according to an exemplary embodiment of the present disclosure, FIG. 2A is an enlarged plan view of a portion P1 of FIG. 1, FIG. 2B is a cross-sectional view taken along the line I-I' of FIG. 2A, and FIG. 2C is a cross-sectional view taken along the line II-II' of FIG. 2B.

Referring to FIG. 1, the touch panel TSP includes a touch sensor formed in a sensing area SA of a base substrate BS, and a wire portion formed in a peripheral area PA.

The touch sensor recognizes a touch event received by a display device through a user's fingers or a separate input capability, such as a stylus. In exemplary embodiments of the present disclosure, the touch sensor is a capacitive touch sensor.

Referring to FIG. 1 and FIG. 2A to FIG. 2C, the touch sensor includes a plurality of first sensing parts or first sensing portions SR1 extending in a first direction D1 and receiving a sensing voltage, and a plurality of second sensing parts or second sensing portions SR2 extending in a second direction D2 crossing the first direction D1. The first sensing parts SR1 are capacitively coupled to the second sensing parts SR2, and a voltage formed therebetween can be changed due to the capacitive coupling.

Each first sensing part SR1 includes a plurality of first sensing electrodes SE1 arranged in the first direction D1, and a plurality of first bridges BR1 that connect two adjacent first electrodes SE1 to each other. The first sensing electrodes SE1 can be formed to have various shapes. For example, each first sensing electrode SE1 can be formed to have a rod shape or a polygon shape including quadrangles such as a rhombus, etc.

In the embodiment of FIG. 1 and FIG. 2A to FIG. 2C, the first sensing electrodes SE1 and the first bridges BR1 are formed in a mesh which includes fine lines. The fine lines forming the first sensing electrodes SE1 and the first bridges BR1 will henceforth be referred as first fine lines for convenience of description.

Each second sensing part SR2 includes a plurality of second sensing electrodes SE2 arranged in a second direction D2, and a plurality of second bridges BR2 that connect adjacent two second electrodes SE2 to each other. The second sensing electrodes SE2 can be formed to have various shapes. For example, each second sensing electrode SE2 can be formed to have a rod shape or a polygon shape including quadrangles such as a rhombus, etc.

The first sensing electrodes SE1 and the second sensing electrodes SE2 are alternately arranged in a matrix on the base substrate BS.

In one embodiment, the second sensing electrodes SE2 and the second bridges BR2 are formed in a mesh which includes fine lines. The fine lines forming the second sensing electrodes SE2 and the second bridges BR2 will henceforth be referred as second fine lines for convenience of description.

In the first sensing parts SR1, the first sensing electrodes SE1 can be integrated with the first bridges BR1 such that they are inseparable. In addition, in the second sensing parts SR2, the second sensing electrodes SE2 can be integrated with the second bridges BR2 such that they are inseparable.

The wire portion connects the touch sensor to a driving circuit (not shown) for driving the touch panel TSP. The driving circuit can be formed outside of the display device and can include a detecting circuit. The wire portion can transmit a sensing input signal from the driving circuit to the first sensing parts SR1 and the second sensing parts SR2, or can transmit a sensing output signal from the first sensing parts SR1 and the second sensing parts SR2 to the driving circuit.

The wire portion can include a plurality of first connection lines CL1, a plurality of second connection lines CL2, and a pad portion PD.

One end of each of the first connection lines CL1 is connected to one of the first sensing parts SRL while the other end is connected to the pad portion PD. When viewed in a plan view, the first connection lines CL1 can have multiple bends within the peripheral area PA.

One end of each of the second connection lines CL2 is connected to one of the second sensing parts SR2, while the other end is connected to the pad portion PD. When viewed in a plan view, the first connection lines CL1 can have multiple bends within the peripheral area PA.

The pad portion PD connects the first connection lines CL1 and the second connection lines CL2 to the driving circuit, and can be formed at a side of the peripheral area PA. The first connection lines CL1 and the second connection lines CL2 are electrically connected to the driving circuit by a connector or a non-conductive film which is attached to the pad portion PD.

The touch panel according to at least one exemplary embodiment is described below in more detail with reference to FIG. 1, FIG. 2A to FIG. 2C.

The base substrate BS can be formed of a transparent insulating material and can be flexible or inflexible. The base substrate BS can have a substantially quadrangular shape, but the present disclosure is not necessarily limited thereto. In other words, the base substrate BS can be formed to have various shapes.

The base substrate BS can be formed of various materials, such as glass, polymer, metal, etc. For example, the base substrate BS can be formed of one or more of the following: a polymeric material, such as polyethylene terephthalate (PET), polymethylmethacrylate (PMMA), polypropylene (PP), polyethylene (PE), polyethylenenaphthalenedicarboxylate (PEN), polycarbonate (PC), polyether sulfone (PES), polyimide (PI), polyvinyl alcohol (PVA), cyclic olefin copolymer (COC), styrene polymer, etc. The type of polymer used in forming the base substrate BS is not limited.

The first sensing parts SR1 are provided on the base substrate BS. When viewed in a plan view, the first sensing parts SR1 extend in the first direction D1. Each first sensing part SR1 includes the first sensing electrodes SE1 formed in the first direction, and the first brides BR1 that connect the first electrodes SE1 adjacent to each other.

In the first sensing parts SR1, the first sensing electrodes SE1 and the first bridges BR1 can be formed as an inseparable body (e.g., they can be integrally formed). The first sensing electrodes SR1 and the first bridges BR1 are formed on the same plane (that is, on the base substrate BS). The first sensing parts SR1 can be formed in a mesh shape having a lattice structure. That is, the first fine lines of the first sensing parts SR1 cross with each other to form a lattice.

The first sensing electrodes SE1 and the first bridges BR1 are formed of a conductive material.

In detail, metal, an alloy thereof, a conductive polymer, a conductive metal oxide, a nano conductive material, and so forth can be used to form the first sensing electrodes SE1 and the first bridges BR1.

In more detail, a metal, such as cooper (Cu), silver (Ag), gold (Au), platinum (Pt), palladium (Pd), nickel (Ni), tin (Sn), aluminum (Al), cobalt (Co), rhodium (Rh), iridium (Ir), iron (Fe), ruthenium (Ru), osmium (Os), manganese (Mn), molybdenum (Mo), tungsten (W), niobium (Nb), tantalum (Ta), titanium (Ti), bismuth (Bi), antimony (Sb), lead (Pb), and so forth can be used to form the first sensing electrodes and the first bridge BR1.

Also, a conductive polymer, such as polythiophene, polypyrrole, polyaniline, polyacetylene, and polyphenylene compounds, and mixtures of them can be used, and PEDOT/PSS compound from among the polythiophen-based compounds can be used in certain embodiments.

As the conductive metal oxide used to form the first sensing electrodes and the first bridge BR1, Indium Tin Oxide (ITO), Indium Zinc Oxide (IZO), Antimony Zinc Oxide (AZO), Indium Tin Zinc Oxide (ITZO), Zinc Oxide (ZnO), Tin Oxide (SnO2), and so forth can be used.

As the nano conductive compound used to form the first sensing electrodes and the first bridge BR1, Ag nanowire (AgNW), carbon nano tube, grapheme, and so forth can be used.

Each of the first sensing electrodes SE1 and the first bridges BR1 can be formed of a single layer or a multilayer in which two or more materials selected among the materials listed above are stacked.

The first connection lines CL1 of the wire portion can be formed on the same layer as the first sensing part SR1 and with the same material.

A first insulating layer INS1 is formed on the base substrate BS on which the first sensing electrodes SE1 and the first bridges BR1 are formed.

The first insulating layer INS1 covers the first sensing parts SR1 on the base substrate BS. In detail, the first insulating layer INS1 covers the fine lines forming the first sensing electrodes SE1 and the first bridges BR1. In at least one embodiment, the first insulating layer INS1 is formed to cover only the first fine lines and does not cover the space between the adjacent first fine lines. In this embodiment, the first insulating layer INS1 is not formed at locations where the second sensing electrodes SE2 will be formed. That is, the first insulating layer INS1 is not formed in the space between the adjacent first fine lines and thus a top surface of the base substrate BS is partially exposed through these spaces. The first insulating layer INS1 can thus have a plurality of spaces or openings formed therein corresponding to the spaces formed between the first fine lines.

The first insulating layer INS1 fully covers the side and top surfaces of the first fine lines. When a portion of the first insulating layer INS1 that covers a top surface of each first fine line is referred to as "an upper portion" and the remaining portion that covers sides is referred to as "a side portion," the side portion can be formed to be thicker than the upper portion. Such a difference in thickness of the first insulting layer INS1 is considered for a process margin in a manufacturing process and can prevent a short with the second fine line occurring when the side portion is formed to be thinner than expected during the manufacturing process.

The first insulating layer INS1 can be an organic insulating layer or an inorganic insulating layer. In detail, the first insulating layer INS1 can be formed of an organic insulating material, such as a polyacryl-based compound, a polyimide-based compound, a fluorine-based carbon compound such as Teflon®, a benzocyclobutene compound, and so forth, or an inorganic insulating material, such as polysiloxane, silicon nitride (SiNx), silicon oxide (SiOx) and so forth.

The second sensing parts SR2 are formed on the first insulating layer INS1. When viewed in a plan view, the second sensing parts SR2 can extend in the second direction D2 crossing the first direction D1. Each second sensing part SR2 includes the second sensing electrodes SE2 arranged in the second direction, and the second brides BR2 that connect the second electrodes SE2 adjacent to each other.

The second sensing electrodes SE2 and the second bridges BR2 can be formed as an inseparable body (e.g., they can be integrally formed).

The second sensing electrodes SE2 are formed on the same layer as the first sensing electrodes SE1 and the first bridges BR1. That is, the first and second sending electrodes SE1 and SE2 and the first bridges BR1 are formed on the base substrate BS. The second sensing parts SR2 are formed in a mesh shape having a lattice structure. That is, the second fine lines of the second sensing parts SR2 cross each other to form a lattice.

The second bridges BR2 of the second sensing parts SR2 and the first bridges BR1 of the second sensing parts SR2 cross each other. In this structure, the first insulating layer INS1 is interposed between the first bridges BR1 and the second bridges BR2 at the intersections therebetween. The first insulating layer INS1 electrically insulates the first bridges BR1 and the second bridges BR2 from each other.

When viewed in a plan view, the first bridges BR1 and the second bridges BR2 are substantially entirely overlap each other, but the present disclosure is not necessarily limited thereto. That is, in some embodiment, only certain portions of the first and second bridges BR1 and BR2 overlap each other.

The second sensing electrodes SE2 and the second bridges BR2 are formed a conductive material.

In detail, a metal, an alloy thereof, a conductive polymer, a conductive metal oxide, a nano conductive material, and so forth can be used to form the second sensing electrodes SE2 and the second bridges BR2.

The metal, the alloy thereof, the conductive polymer, the conductive metal oxide, and the nano conductive material available for the formation of the second sensing electrodes SE2 and the second bridges BR2 are same as the materials listed in describing the first sensing electrodes SE1 and the first bridges BR1.

The second sensing electrodes SE2 and the second bridges BR2 are formed of the same material as the first sensing electrodes SE1 and the first bridges BR1 in at least one embodiment, but may be also formed of a different material.

The second connection lines CL2 of the wire portion can be formed on the same layer as the second sensing parts SR2 and with the same material.

A second insulating layer INS2 is formed on the base substrate BS on which the second sensing electrodes SE2 and the second bridges BR2 are formed.

The second insulating layer INS2 covers the second sensing parts SR2 on the base substrate BS. In detail, the second insulating layer INS2 covers the fine lines forming the second sensing electrodes SE2 and the second bridges BR2. In one embodiment, the second insulating layer INS2 is formed to cover only the second fine lines, and does not cover the space between the adjacent second fine lines. In this embodiment, the second insulating layer INS2 is not formed at positions where the first sensing electrodes SE1 are formed. That is, the second insulating layer INS2 is not formed in the space between the adjacent second fine lines, and thus the top surface of the base substrate BS is partially exposed through these spaces. The second insulating layer INS2 can thus have a plurality of spaces or openings formed therein corresponding to the spaces formed between the second fine lines.

The second insulating layer INS2 fully covers the side and top surfaces of the second fine lines.

The second insulating layer INS2 can be an organic insulating layer or an inorganic insulating layer. In detail, the second insulating layer INS2 can be formed of an organic insulating material, such as a polyacryl-based compound, a polyimide-based compound, a fluorine-based carbon compound such as Teflon®, a benzocyclobutene compound, and so forth, or an inorganic insulating material, such as polysiloxane, silicon nitride (SiNx), silicon oxide (SiOx) and so forth.

The second insulating layer INS2 can be formed of the same material as the first insulating layer INS1. In this embodiment, the refection, dispersion, and reflection of transmitted light occurring at an interface between the first insulating layer INS1 and the second insulating layer INS2 can be minimized.

The touch panel with the structure described above has at least the following merits.

In at least one embodiment, the first and second insulating layers INS1 and INS2 are not formed on certain areas of the base substrate BS, except for the areas in which the first and second sensing parts SR1 and SR2 are formed. Accordingly, the absorption of transmitted light due to the presence of the first and second insulating layers INS1 and INS2 decreases compared to when the first and second insulating layers INS1 and INS2 are formed over the entirety of the sensing area SA, and thus the amount of light passing through the touch panel increases.

In at least one embodiment, the second sensing electrodes SE2 are formed at the same layer as the first sensing electrodes SE1 (that is, they are formed directly on the base substrate BS with first sensing electrodes SE1). Accordingly, a difference in visibility does not occur between the first and second sensing electrodes SE1 and SE2. In the standard touch panel, the first sensing electrodes and the second sensing electrodes are respectively formed on different layers. In this situation, the differences in height between the first sensing electrodes and the second sensing electrodes can be seen in the shape of a lattice pattern by a user. However, in at least one embodiment of the present disclosure, since the first and second sensing electrodes SE1 and SE2 are formed on the same layer, the above-mentioned problem of the standard touch panel art can be solved.

In addition, since the second sensing electrodes SE2 and the second bridges BR2 are formed as an inseparable body in at least one embodiment, loose contact or the formation of open circuits between the second sensing electrodes SE2 and the second bridges BR2 can be prevented or reduced. In the standard touch panel, after the second sensing electrodes and the first sensing electrodes are formed on the same layer through the same process at the same time, the second sensing electrodes adjacent to each other are connected using the second bridges, having an insulating layer therebetween. However, since the second sensing electrodes and the second bridges are formed in a mesh shape, the contact areas therebetween may not be sufficiently large to prevent open circuits. Accordingly, it is difficult to overlay the second sensing electrodes with the second bridges so as to ensure sufficient contact therebetween. When an area of each second bridge is enlarged to increase the contact area between the second sensing electrode and the second bridge, the second bridges can be seen by a user. Therefore, to solve the problem of the standard touch panel, at least one embodiment of the present disclosure forms the second sensing electrodes SE2 and the second bridges BR2 as an inseparable body through one process at the same time.

A manufacturing method of the touch panel with the structure described above are described below with reference to FIG. 3A to FIG. 3D.

FIG. 3A to FIG. 3D are cross-sectional views for sequentially showing a manufacturing method of the touch panel shown in FIG. 2B.

Figure 3A:
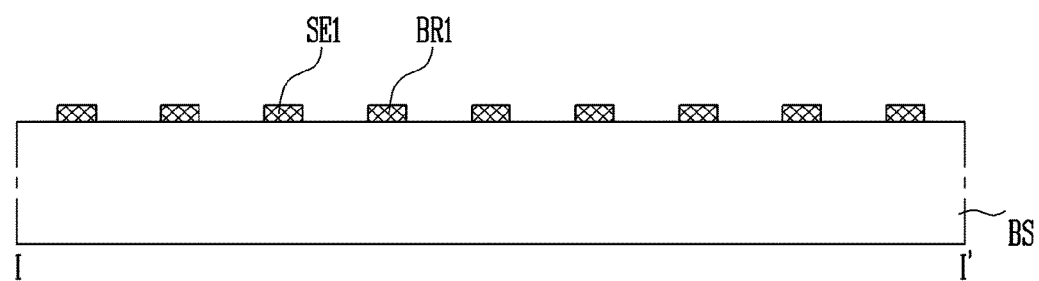
FIG. 3A to FIG. 3D are cross-sectional views sequentially illustrating a manufacturing method of the touch panel shown in FIG. 2B.

Referring to FIG. 3A, the first sensing parts SR1 including the first sensing electrodes SE1 and the first bridges BR1 are first formed on the base substrate BS. The first sensing parts SR1 consist of the first fine lines.

The formation method of the first sensing electrodes SE1 and the first bridges BR1 can be changed depending on what is used as the formation material. In an embodiment of the present disclosure, the first sensing electrodes SE1 and the first bridges BR1 are formed by patterning a conductive layer formed on the base substrate BS. In this embodiment, various patterning methods can be used. For example, a photolithography process using a mask can be used.

In detail, the photolithography process for the formation of the first sensing electrodes SE1 and the first bridges BR1 can performed as described below.

First, a conductive layer and a photoresist are sequentially formed on the base substrate BS. Then, the photoresist is developed and exposed in order to obtain a specific photoresist pattern. Then, an etching process for the conductive layer is performed so that the conductive layer is patterned using the remaining photoresist pattern as a mask. Last, the remaining photoresist pattern is removed.

However, the method for forming the first sensing electrodes SE1 and the first bridges BR1 is not necessarily limited to the processes described above. For example, a printing process can be used.

The first connection lines CL1 (not shown) provided in the peripheral area PA, and the pad portion PD (not shown) connected to the first connection lines CL1 can be formed with the first sensing electrodes SE1 and the first bridges BR1.

Figure 3B:
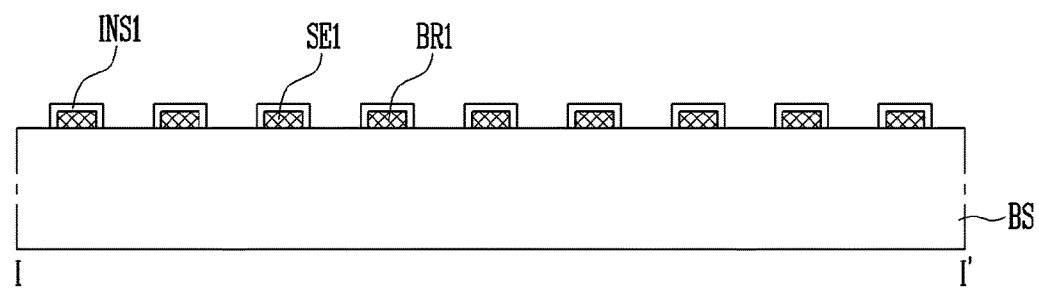

The first insulating layer INS1 is then formed on the base substrate BS on which the first sensing electrodes SE1 and the first bridges BR1 are formed as shown in FIG. 3B. In detail, a layer of an organic insulating material or an inorganic insulating material is first formed on the base substrate BS, and then the layer is patterned through a photolithography process, etc. In this embodiment, the layer is patterned to cover the first fine lines and for the base substrate BS and to be removed from the locations where the first fine lines are not formed, thereby forming the first insulating layer INS1. Such a formed first insulating layer INS1 fully covers a top surface and sides of each first fine line, and is not formed in the space between the adjacent first fine lines.

Figure 3C:
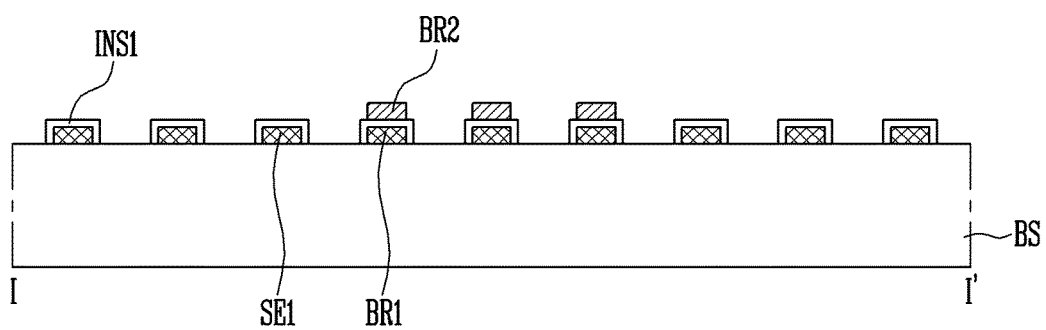

Referring to FIG. 3C, the second sensing parts SR2 including the second sensing electrodes SE2 (not shown) and the second bridges BR2 are formed on the base substrate BS on which the first insulating layer INS1 is formed. The second sensing electrodes SE2 and the second bridges BR2 consist of the second fine lines.

Like the first sensing electrodes SE1 and the first bridges BR1, the formation method of the second sensing electrodes SE2 and the second bridges BR2 can be changed depending on what is used as the formation material. In an embodiment of the present disclosure, the second sensing electrodes SE2 and the second bridges BR2 are formed by patterning a conductive layer formed on the base substrate BS. In this embodiment, various patterning methods can be used. For example, a photolithography process using a mask can be used. Here, the second sensing electrodes SE2 and the second bridges BR2 can be formed as an inseparable body.

In detail, the photolithography process for the formation of the second sensing electrodes SE2 and the second bridges BR2 can performed as described below.

First, a conductive layer and a photoresist are sequentially formed on the base substrate BS. Then, the photoresist is developed and exposed in order to obtain a specific photoresist pattern. Then, an etching process for the conductive layer is performed so that the conductive layer is patterned using the remaining photoresist pattern as a mask. Lastly, the remaining photoresist pattern is removed.

In the embodiment in which the photolithography is used for the formation of the second sensing electrodes SE2 and the second bridges BR2, the first insulating layer INS1 protects the first sensing electrodes SE1 and the first bridges BR2 even during the etching process for the conductive layer is performed to form the second sensing electrodes SE2 and the second bridges BR2. Accordingly, the first sensing electrodes SE1 and the first bridges BR1 are not damaged while the second sensing electrodes SE2 and the second bridges BR2 are formed.

The method for forming the second sensing electrodes SE2 and the second bridges BR2 is not necessarily limited to the processes described above. For example, a printing process can be also used.

The second sensing electrodes SE2 are formed at locations on the base substrate BS where the first sensing electrodes SE1 and the first bridges BR1 are not formed. In other words, the second sensing electrodes SE2, the first sensing electrodes SE1, and the first bridges BR1 are formed on the same layer.

The second bridges BR2 are formed at areas corresponding to areas where the first bridges BR1 are formed, crossing the first bridges BR1.

In at least one embodiment of the present disclosure, the areas where the second bridges BR2 are formed coincide with the areas where the first bridges BR1 are formed, but the present disclosure is not necessarily limited thereto. For example, the second bridges BR2 can be formed on the first bridges BR1, crossing the first bridges BR1. In addition, at least a portion of each second bridge BR2 can be formed on one first bridge BR1, having the insulating layer INS1 therebetween. In this embodiment, some of the remaining portions are directly formed on the base substrate BS.

The second connection lines CL2 (not shown) provided in the peripheral area PA, and the pad portion PD (not shown) connected to the second connection lines CL2 can be formed with the second sensing electrodes SE2 and the second bridges BR2.

Figure 3D:
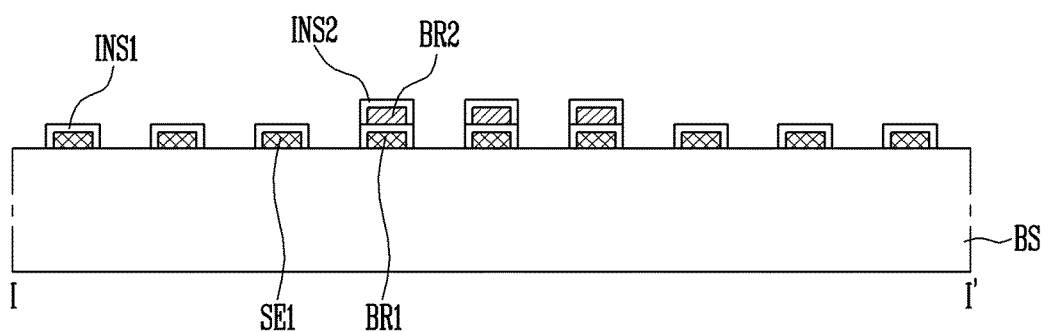

As shown in FIG. 3D, the second insulating layer INS2 are then formed on the base substrate BS on which the first sensing parts SR1 and the second sensing parts SR2 are formed. In detail, a layer of an organic insulating material or an inorganic insulating material is first formed on the base substrate BS, and then the layer is patterned through a photolithography process. In this embodiment, the layer is patterned to cover the second fine lines and for the base substrate BS to be exposed at points where the second fine lines are not formed, thereby forming the second insulating layer INS2. A second insulating layer INS2 formed in this way fully covers a top surface and sides of each second fine line, and is not formed in the space between the adjacent second fine lines.

In the standard touch panel, the insulating layer is formed only on intersections of the first bridges and the second bridges to insulating the first bridges from the second bridges. In this situation, the first sensing parts (particularly, the first sensing electrodes) are exposed during some processes for patterning the second sensing parts, and thus they are damaged. However, in at least one the embodiment of the present disclosure, the first sensing parts SR1 are fully covered with the first insulating layer INS1 in order to prevent them from being damaged.

FIG. 4A to FIG. 4F are cross-sectional views for sequentially showing another manufacturing method of the touch panel shown in FIG. 2B.

Figure 4A:
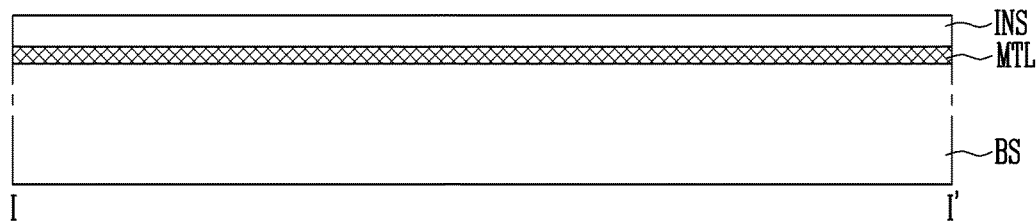
FIG. 4A to FIG. 4F are cross-sectional views sequentially illustrating another manufacturing method of the touch panel shown in FIG. 2B.

Referring to FIG. 4A, a conductive layer MTL and an insulating layer INS are sequentially formed on the base substrate BS.

The conductive layer MTL can be formed of a metal, an alloy thereof, a conductive polymer, a conductive metal oxide, and/or a nano conductive material. In this embodiment, various processes, such as deposition, printing, coating, and so forth can be used to form the conductive layer MTL.

The insulating layer INS can be formed of an organic insulating material with photosensitivity. Various processes, such as printing, coating, and so forth can be used for the formation of the insulating layer INS.

Figure 4B:
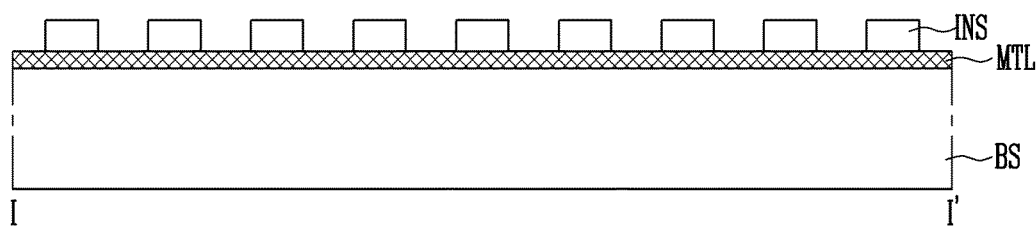

Referring to FIG. 4B, the insulating layer INS is patterned along areas where the first sensing electrodes SE1 and the first bridges BR1 will be formed. Due to its photosensitivity, the insulating layer INS is patterned by being exposed to light such as ultraviolet rays and by being developed.

Figure 4C:
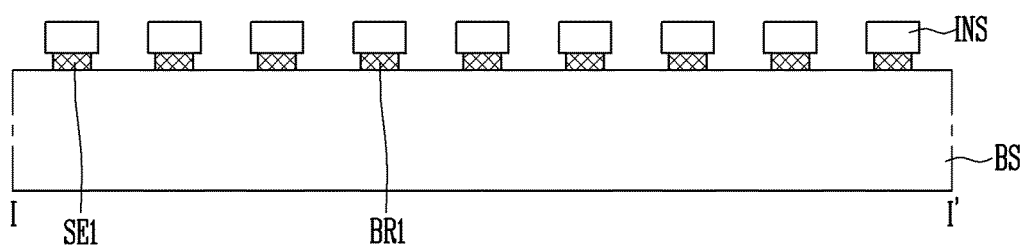

Referring to FIG. 4C, the conductive layer MTL is etched using a mask of the patterned insulating layer INS, thereby forming the first sensing electrodes SE1 and the first bridges BR1. The conductive layer MTL can be patterned by a wet etching process, and an etchant for the wet etching can be selected. When the conductive layer MTL is patterned by wet etching, it is undercut below the patterned insulating layer INS. Accordingly, the patterned conductive layer is slightly narrower than the patterned insulating layer INS as shown in FIG. 4C.

The first connection lines CL1 (not shown) provided in the peripheral area PA, and the pad portion PD (not shown) connected to the first connection lines CL1 can be formed with the first sensing electrodes SE1 and the first bridges BR1.

Figure 4D:
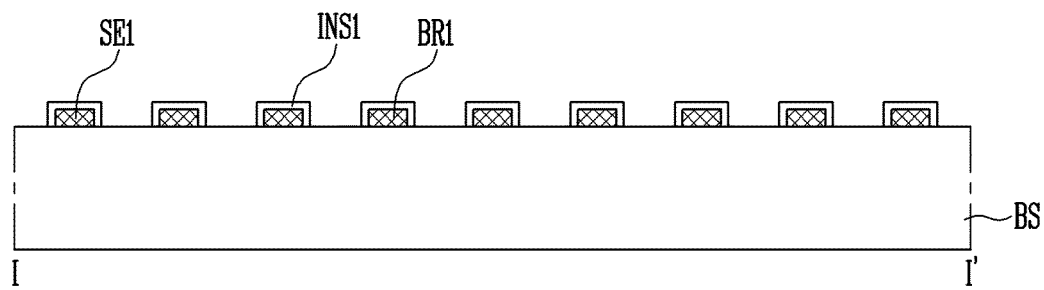

Then, a thermal treatment is performed for reflow of the patterned insulating layer INS. As a result, the first insulating layer INS1 fully covering the first sensing electrodes SE1 and the first bridges BR1 is formed as shown in FIG. 4D.

Figure 4E:
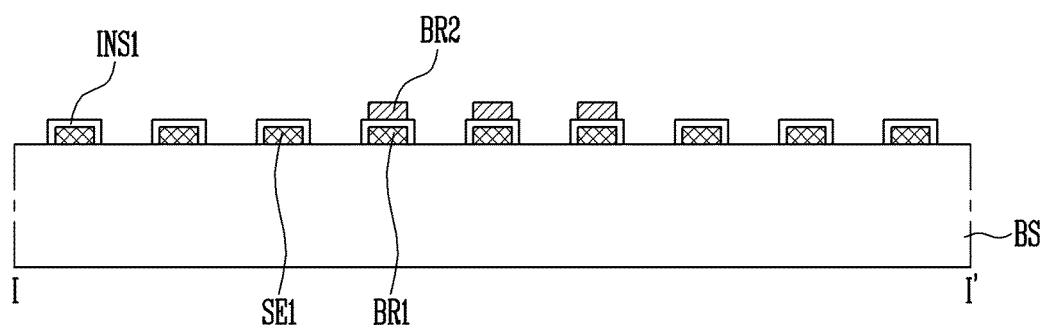

Then, as shown in FIG. 4E, the second sensing parts SR2 including the second sensing electrodes SE2 (not shown) and the second bridges BR2 are formed on the base substrate BS with the first insulating layer INS1 thereon. A method for forming the second sensing parts SR2 is identical to the method described above with reference to FIG. 3C.

The second connection lines CL2 (not shown) formed in the peripheral area PA and the pad portion PD (not shown) connected to the second connection lines CL2 can be formed with the second sensing electrodes SE2 and the second bridges BR2.

Figure 4F:
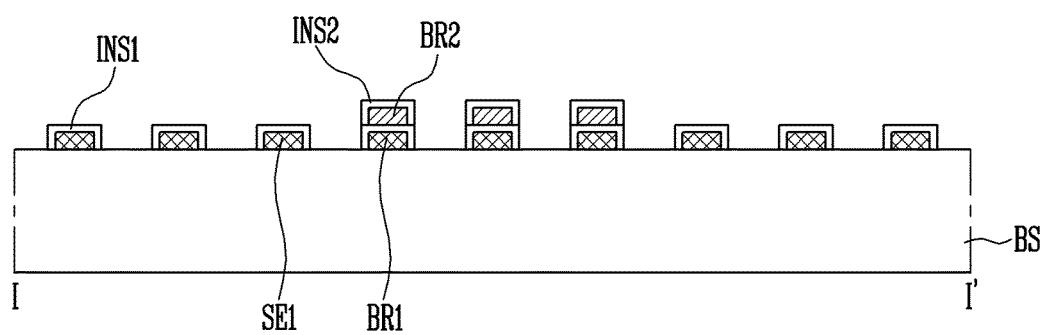

Next, as shown in FIG. 4F, the second insulating layer INS2 is formed on the base substrate BS on which the first sensing parts SR1 and the second sensing parts SR2 are formed. A method for forming the second insulating layer INS2 is identical with the method described above with reference to FIG. 3D.

In the embodiment of the present disclosure, the first insulating layer INS1 fully covering the first sensing parts SR1 is easily formed only by the reflow process without any additional mask process, thereby reducing processing steps.

Figure 5:
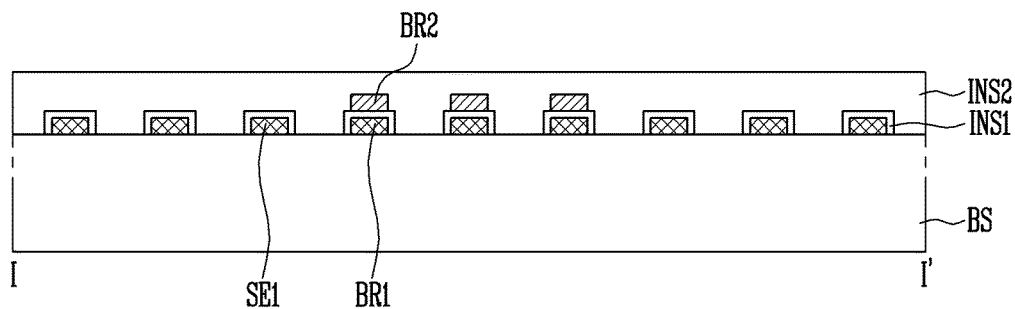
FIG. 5 is a cross sectional view of a display panel according to another exemplary embodiment of the present disclosure.

FIG. 5 is a cross sectional view of a display panel according to another exemplary embodiment of the present disclosure. This figure corresponds to FIG. 2B. In describing the current exemplary embodiment of the present disclosure, only differences from the foregoing exemplary embodiment will be described, and duplicate descriptions will be omitted.

Referring to FIG. 5, the second insulating layer INS2 is differently formed with that of the foregoing exemplary embodiment of FIG. 2B.

In this embodiment, the second insulating layer INS2 is formed on the base substrate BS with the second sensing electrodes SE2 (not shown) and the second bridges BR2 thereon, and completely covers the base substrate BS. That is, the second insulating layer INS2 is formed on areas other than the second sensing electrodes SE2 and the second bridges BR2 as well as on areas including the second sensing electrodes SE2 and the second bridges BR2. Accordingly, this second insulating layer INS2 can function as a planarization layer. In this embodiment, the second insulating layer INS2 substantially flattens the differences in height caused by the first sensing electrodes SE1, the second sensing electrodes Se2, the first bridges BR1, the second bridges BR2, and the first insulating layer INS1.

In this embodiment, the second insulating layer INS2 can be formed of the same material as the first insulating layer INS1. This enables light passing through the sensing areas to have a substantially uniform luminance throughout each of the areas, thus decreasing a visibility difference between the respective areas.

The display panel of this embodiment is applicable for display devices.

Figure 6:
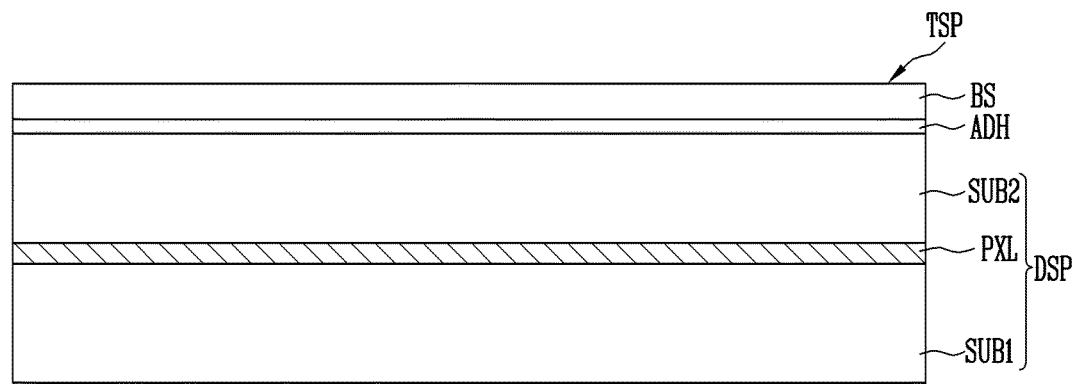
FIG. 6 is a cross-sectional view of a display device employing a touch panel according to an exemplary embodiment of the present disclosure.

FIG. 6 is a cross-sectional view of a display device employing a touch panel according to an exemplary embodiment of the present disclosure.

Referring to FIG. 6, the display device includes a display panel DSP for displaying an image, and a touch panel TSP provided at a side of the display panel DSP. The touch panel TSP can be provided on a screen of the DSP where images are displayed.

The display panel DSP can include a first substrate SUB1, a second substrate SUB2 opposing the first substrate SUB1, and a plurality of pixels PXL interposed between the first substrate SUB1 and the second substrate SUB2. The display panel DSP can be implemented as a liquid crystal display (LCD), an organic light-emitting diode (OLED) display, an electro-wetting display (EWD), an electrophoretic display (EPD), or the like. The type of display device is not limited.

An adhesive layer ADH can be provided between the touch panel TSP and the display panel DSP. The touch panel TSP can be adhered to the display panel DSP by the adhesive layer ADH.

Figure 7:
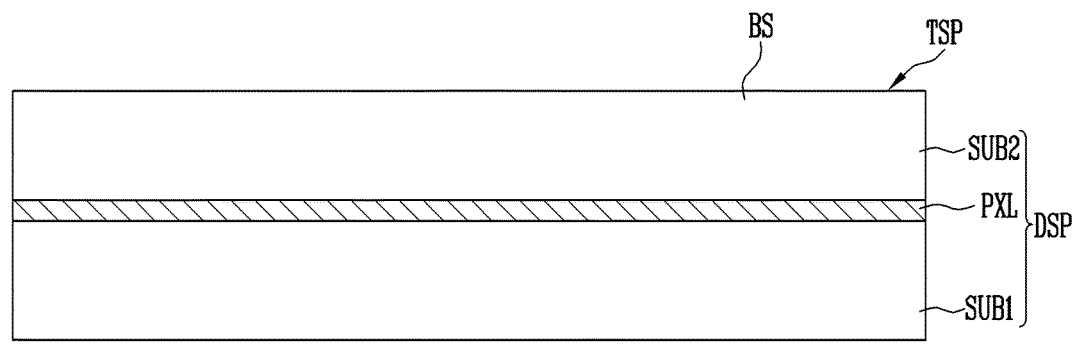
FIG. 7 is a cross-sectional view of a display device employing a display panel according to an exemplary embodiment of the present disclosure.

FIG. 7 is a cross-sectional view of a display device employing a display panel according to an exemplary embodiment of the present disclosure.

Referring to FIG. 7, the display device includes a display panel DSP for displaying an image, and a touch panel TSP provided at a side of the display panel DSP.

The display panel DSP can include a first substrate SUB1, a second substrate SUB2 opposing the first substrate SUB1, and a plurality of pixels PXL interposed between the first substrate SUB and the second substrate SUB2.

The touch panel TSP includes the base substrate BS. The touch panel further includes the first sensing parts SUB1, the second sensing parts SE2, and the first insulating layer INS1 formed on the base substrate BS. In FIG. 7, only the base substrate BS is illustrated, and the first sensing parts SUB1, the second sensing parts SE2, and the first insulating layer INS1 are omitted for ease of description.

The base substrate BS of the touch panel TSP can be formed as an inseparable body with one of the substrates SUB and SUB2, for example, the second substrate SUB2. That is, the second substrate SUB2 of the display panel DSP can be shared with the base substrate BS of the touch panel TSP. Accordingly, the touch panel can be implemented without any additional base substrate by directly forming first sensing parts SUB1, the second sensing parts SE2, and the first insulating layer on the second substrate SUB2.

Example embodiments have been disclosed herein and although specific terms are employed, they are used and are to be interpreted in a generic and descriptive sense only and not for purpose of limitation. In some examples, as would be apparent to one of ordinary skill in the art as of the filing of the present application, features, characteristics and/or elements described in connection with a particular embodiment may be used singly or in combination with features, characteristics and/or elements described in connection with other embodiments unless otherwise specifically indicated. Accordingly, it will be understood by those of skill in the art that various changes in form and details may be made without departing from the spirit and scope of the invention as set forth in the following claims.

What is claimed is:

1. A touch panel, comprising:
a base substrate;
a first sensing portion extending in a first direction and formed over the base substrate, the first sensing portion comprising a plurality of first fine lines defining a plurality of spaces therebetween;
a second sensing portion extending in a second direction crossing the first direction and formed over the base substrate; and
a first insulating layer covering the first fine lines, the first insulating layer defining a plurality of openings therein corresponding to the spaces between the first fine lines,
wherein the openings do not overlap the second sensing portion in the depth direction of the touch panel, and
wherein the second sensing portion crosses the first sensing portion with the first insulating layer interposed therebetween.

2. The touch panel of claim 1, wherein the first sensing portion includes a plurality of first sensing electrodes arranged in the first direction, and a plurality of first bridges that respectively connect adjacent first sensing electrodes with each other.

3. The touch panel of claim 2, wherein the second sensing portion includes a plurality of second sensing electrodes arranged in the second direction, and a plurality of second bridges that respectively connect adjacent second electrodes with each other, and wherein the first bridges respectively overlap the second bridges when viewed in a plan view with the first insulating layer interposed therebetween.

4. The touch panel of claim 3, wherein the first sensing electrodes and the second sensing electrodes are formed on the same layer.

5. The touch panel of claim 1, wherein the first insulating layer includes:
an upper portion that covers a top surface of each of the first fine lines; and
a side portion that covers sides of each of the first fine lines,
wherein the side portion is thicker than the upper portion.

6. The touch panel of claim 1, wherein the second sensing portion includes second fine lines.

7. The touch panel of claim 6, further comprising a second insulating layer that covers the second fine lines.

8. The touch panel of claim 7, wherein the second fine lines define a plurality of spaces therebetween and wherein the second insulating layer defines a plurality of openings therein corresponding to the spaces between the first fine lines.

9. The touch panel of claim 7, wherein the second insulating layer is formed of the same material as that of the first insulating layer.

10. A display device, comprising:
a display panel configured to display an image; and
a touch panel located at a side of the display panel,
wherein the touch panel includes:
a base substrate;
a first sensing portion extending in a first direction and formed over the base substrate, the first sensing portion comprising a plurality of first fine lines defining a plurality of spaces therebetween;
a second sensing portion extending in a second direction crossing the first direction; and
a first insulating layer covering the first fine lines, the first insulating layer defining a plurality of openings therein corresponding to the spaces between the adjacent first fine lines,
wherein the openings do not overlap the second sensing portion in the depth direction of the touch panel, and
wherein the second sensing portion crosses the first sensing portion with the first insulating layer interposed therebetween.

11. The display device of claim 10, further comprising an adhesive layer interposed between the touch panel and the display panel and attaching the touch panel to the display panel.

12. The display device of claim 10, wherein the display panel includes:
a first substrate;
a second substrate opposing the first substrate; and
a plurality of pixels interposed between the first substrate and the second substrate.

13. The display device of claim 12, wherein the base substrate and the second substrate are integrally formed.

14. A method of manufacturing a touch panel, comprising:
forming a first sensing portion comprising a plurality of first fine lines over a base substrate, the first fine lines defining a plurality of spaces therebetween;
forming a first insulating layer so as to cover the first fine lines, the first insulating layer defining a plurality of openings therein corresponding to the spaces between the adjacent fine lines; and
forming a second sensing portion comprising a plurality of second fine lines over the base substrate,
wherein the openings do not overlap the second sensing portion in the depth direction of the touch panel.

15. The method of claim 14, wherein the forming the first insulating layer includes:
forming an insulating layer over the base substrate where the first sensing portion is formed; and
patterning the insulating layer using photolithography.

16. The method of claim 14, wherein the forming the first sensing portion and the forming the first insulating layer include:
forming a conductive layer and an insulating layer over the base substrate;
patterning the insulating layer;
etching the conductive layer using the patterned insulating layer as a mask; and
performing a thermal treatment to reflow the patterned insulating layer.

* * * * *